(12) United States Patent
Radtke (10) Patent No.: US 11,612,950 B2
(45) Date of Patent: Mar. 28, 2023

(54) METHODS AND APPARATUS FOR HYBRID WELDER MODES OF OPERATION

(71) Applicant: Illinois Tool Works Inc., Glenview, IL (US)

(72) Inventor: David Edwin Radtke, New London, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 742 days.

(21) Appl. No.: 16/397,545

(22) Filed: Apr. 29, 2019

(65) Prior Publication Data

US 2019/0329346 A1 Oct. 31, 2019

Related U.S. Application Data

(60) Provisional application No. 62/664,609, filed on Apr. 30, 2018.

(51) Int. Cl.
*B23K 9/10* (2006.01)
*H02J 7/00* (2006.01)
*H02J 7/34* (2006.01)

(52) U.S. Cl.
CPC .......... *B23K 9/1056* (2013.01); *B23K 9/1043* (2013.01); *H02J 7/007182* (2020.01); *H02J 7/345* (2013.01); *H02J 2207/20* (2020.01)

(58) Field of Classification Search
CPC ........ B23K 9/10; B23K 9/095; B23K 9/0953; B23K 9/1012; B23K 9/1081;
(Continued)

(56) References Cited

U.S. PATENT DOCUMENTS

2010/0187210 A1* 7/2010 Albrecht ............. B23K 9/1081
219/133
2011/0006046 A1 1/2011 Albrecht
(Continued)

FOREIGN PATENT DOCUMENTS

CN 105142841 12/2015

OTHER PUBLICATIONS

PCT, Notification of Transmittal of the International Search Report and the Written Opinion of the International Searching Authority, or the Declaration, Application No. PCT/US2019/029785, dated Aug. 5, 2019, 14 pages.

*Primary Examiner* — Brian W Jennison
(74) *Attorney, Agent, or Firm* — McAndrews, Held & Malloy, Ltd.

(57) ABSTRACT

Apparatus and methods are provided for a welding-type power system that includes an engine configured to drive an electric generator to provide a first power output. An energy storage device to provide a second power output. A controller is configured to receive one or more control signals to provide a total power output to at least one of a welding-type output or an auxiliary type output, determine proportional values for the first power output and the second power output that add up to the total power output based on a power demand signal that indicates a contribution of the first power output and the second power output, control the engine to adjust speed based on the first power output value, and control a connection from the energy storage device to provide the second power output to the welding-type output based on the second power output value.

19 Claims, 4 Drawing Sheets

(58) Field of Classification Search
CPC ...... B23K 9/1043; B23K 9/32; B23K 9/1087; B23K 9/1006; B23K 9/1056; B23K 9/1062; H02J 7/345; H02J 2007/0067; H02J 2207/20
See application file for complete search history.

(56) References Cited

U.S. PATENT DOCUMENTS

| | | | |
|---|---|---|---|
| 2011/0114607 A1 | 5/2011 | Albrecht et al. | |
| 2014/0263238 A1 | 9/2014 | Ulrich et al. | |
| 2015/0273607 A1* | 10/2015 | Denis | H04W 12/50 |
| | | | 219/133 |
| 2016/0067809 A1* | 3/2016 | Enyedy | B23K 9/32 |
| | | | 219/133 |
| 2018/0079023 A1* | 3/2018 | Enyedy | B23K 9/1006 |

* cited by examiner

FIG. 4

METHODS AND APPARATUS FOR HYBRID WELDER MODES OF OPERATION

CROSS REFERENCE TO RELATED APPLICATIONS

This application claims priority from and the benefit of U.S. Provisional Patent Application Ser. No. 62/664,609, entitled "METHODS AND APPARATUS FOR HYBRID WELDER MODES OF OPERATION," filed Apr. 30, 2018, which is hereby incorporated by reference in its entirety for all purposes.

BACKGROUND

Conventional welding-type power supplies provide power for welding-type tools. Some such power supplies are coupled to a fossil fuel-powered engine that drives an electric generator. In some cases, the generator output can be augmented by a secondary power source, such as a battery. A system that can increase the efficiency of the cooperating systems, and provide control for regulating output levels of the engine and the secondary power source, would provide various advantages, such as reduced wear and lower operating costs, which is desirable.

SUMMARY

Apparatus and methods are disclosed of an engine driven welding-type power system that includes an engine to drive an electric generator to provide a first power output, and an energy storage device to provide a second power output, for example, a hybrid welder. In particular, the system employs an energy storage device that cooperates with the engine to supplement and/or substitute the power provided to an output of the system by the engine based on a desired proportional output from each of the engine and the energy storage device, substantially as illustrated by and described in connection with at least one of the figures, as set forth more completely in the claims.

In disclosed examples, a welding-type power system includes an engine configured to drive an electric generator to provide a first power output. An energy storage device to provide a second power output. A controller is configured to receive one or more control signals to provide a total power output to at least one of a welding-type output or an auxiliary type output; determine proportional values for the first power output and the second power output that add up to the total power output based on a power demand signal that indicates a contribution of the first power output and the second power output; control the engine to adjust speed based on the first power output value; and control a connection from the energy storage device to provide the second power output to the welding-type output based on the second power output value.

In some examples, the power demand signal is generated in response to a command from a user interface. In an example, the user interface includes a selector for input of the contribution based on a target engine operating efficiency value and a remaining target life of the energy storage device. In examples, engine operating efficiency is based on engine speed, temperature, fuel consumption, or total time in operation.

In some examples, the controller is further configured to calculate a number of performed discharge cycles of the energy storage device, determine a number of remaining discharge cycles of the energy storage device based on the number of performed discharge cycles, and calculate the power demand signal based on the determined number of remaining discharge cycles.

In examples, a sensor configured to measure a characteristic of the energy storage device, the controller being configured to receive the measured characteristic from the sensor, and determine a remaining target life of the energy storage device based on the characteristic. For example, the characteristic includes voltage, temperature, current, total time in use, or percentage of energy storage capacity depleted during each discharge cycle.

In an example, the controller is configured to compare the total power output to a power output capacity of the energy storage device, and to adjust the value of the second power output to meet the total power output when the total power output is less than the power output capacity of the energy storage device. For example, the total power output can be greater than a power output capacity of the generator.

In examples, a power output capacity of the combined generator and energy storage device is greater than the individual power output capacity of the generator or the energy storage device alone. In an example, a fuel cell configured to provide energy for a power input for the welding system.

In disclosed examples, a welding-type power system includes an engine configured to drive an electric generator to provide a first power output. An energy storage device to provide a second power output. A sensor to monitor a characteristic of the energy storage device. A controller is configured to receive the monitored characteristic and store the characteristic in a memory storage device, generate an operational profile based on usage trends associated with the stored characteristic, determine proportional values for the first power output and the second power output that add up to a total power output based on the operational profile, control the engine to adjust speed to provide the first power output to the welding-type output in response to the first power output value, and to control a connection from the energy storage device to provide the second power output to the welding-type output in response to the second power output value.

In some examples, the operational profile includes a ratio of the first power output to the second power output based on engine operational efficiency and a remaining target life of the energy storage device, respectively. In examples, the controller is further configured to generate an alert when the remaining target life of the energy storage device falls below a threshold value.

In certain examples, a first welding operation corresponds to a first operational profile and a second welding operation corresponds to a second operational profile. For example, the first operation or the second operation corresponds to an arc welding operation, a gouging operation, a MIG welding operation, an auxiliary output, or a battery recharging operation. In examples, the connection includes a boost converter configured to connect the energy storage device to the welding-type output and to convert power from the energy storage device to provide the second power output to the welding-type output.

In some examples, the connection includes a buck converter to connect the energy storage device to the welding-type output in response to a signal indicating the energy storage device is charged below a first threshold level. In certain examples, the controller is configured to control the buck converter to disconnect the energy storage device from the welding-type output in response to a signal indicating the energy storage device is charged above a second threshold level. In examples, the energy storage device includes one or more of a lead acid battery, a nickel cadmium battery, a lithium ion battery, a capacitor, a supercapacitor, or any combination thereof.

BRIEF DESCRIPTION OF THE DRAWINGS

The figures are not necessarily to scale. Where appropriate, similar or identical reference numbers are used to refer to similar or identical components.

DETAILED DESCRIPTION

Disclosed are examples of an engine driven welding-type power system that includes an engine to drive an electric generator to provide a first power output, and an energy storage device to provide a second power output (e.g., a hybrid welder). In particular, the system employs an energy storage device that cooperates with the engine to supplement and/or substitute the power provided to an output of the system by the engine based on a desired proportional output from each of the engine and the energy storage device.

In some examples, an engine driven welder employs an engine (e.g., a diesel-powered engine, a 25-horse power output, etc.). An energy storage device, such as a lead-acid type rechargeable battery, can be added to the system, which can be configured to supplement or replace a power output of the engine (e.g., an electric generator driven by the engine). In examples, power output from the engine may be prioritized over power output from the energy storage device, such as when replacement of the energy storage device is difficult. In other examples, discharge of the energy storage device may be prioritized over engine use, such as when fuel for the engine is not readily available.

The balance between power supplied from the engine and the energy storage device can be controlled by a user input, and/or from one or more algorithms. For example, charge and discharge algorithms of a hybrid welder can be employed to maximize battery life, to maximize fuel efficiency or any balance of output between. Some example user controls and/or algorithms provide nearly infinite adjustability, which can be optimized by the system "learning" different operational trends, such as by identification of operational modes (e.g., a welding-type process, a recharging process, etc.), preferences of a particular user, and/or demands on the machine. Such algorithms can be informed by a plurality of sensors, data from which can be analyzed for near real-time adjustment to an output parameter (e.g., proportional values of respective power outputs), and/or to build operational profiles based on historical data for reference during future operations.

The disclosed system is customizable, such that the operator can select a desired balance of contributions from the engine and/or the energy storage device. Thus, if fuel is particularly expensive, and/or the engine run time should be limited, the operator can instruct the system to limit the contribution of the engine to the total output of the system and/or set a desired engine efficiency rating. Additionally or alternatively, the target life of the energy storage device can be adjusted, based on the number of discharge cycles performed, depth of each and/or an average discharge event, operating temperatures, manufacturing date, service date, etc. Thus, the operator is able to set desired proportional values for one or both of the engine and the energy storage device based on the particular welding operation, equipment in use, or other factors important to the operator.

In some examples, a controller can automatically adjust the proportional values based on a variety of inputs. In this example, the controller can determine a balance of power output for each of the engine and the energy storage device based on a variety of factors. The factors can include the particular operation to be performed (e.g., required power output, length of time the operation is to be performed, etc.), data from sensors associated with one or both of the engine and/or the energy storage device, and historical data compiled by the system during use, and/or historical data compiled by other hybrid systems. Alternatively, the system controller could "learn" (e.g., through artificial intelligence, machine learning techniques, etc.) the operator's usage habits and find the optimum balance of operation. Based on the data, algorithms run by the controller can manage the output balance, and recharge and discharge cycles of the energy storage device, to meet the demands of the system while incorporating the operator's preferred efficiency standards.

In an example, the operator employs a user interface (e.g., a rheostat, switch, touch screen, remote, etc.) through which the operator selects the preferred charging and/or discharging algorithm and/or mode of operation. For instance, a rheostat provides infinite adjustability between efficiency and/or longevity. A computer and/or digital selection tool can also be employed to control the proportional output values.

Maximizing the useful life of an energy storage device (e.g., a rechargeable battery, etc.) is a concern for modern welding systems, including hybrid systems that provide both an engine driven power output and an additional and/or alternative energy storage device to power equipment and welding processes. Ideally, energy storage devices would last the life of the equipment they support. However, in practice, energy storage devices often fail before the end of the useful life of the associated equipment (e.g., the engine), and must be replaced. For example, each rechargeable energy storage device is rated for a particular useful life (e.g., a target life, useful life, capacity, etc.). Useful life and/or capacity may depend on a variety of factors, including a number of discharge cycles performed, depth of each and/or an average discharge event, operating temperatures, manufacturing date, and in-service date, to name but a few. These and other factors can be used to calculate a remaining effective life of an energy storage device, such as remaining capacity, which can determine how often an energy storage device should be replaced.

In some examples, a hybrid welding system employs an engine powered generator and an energy storage device to achieve a maximum power output rating of the system. Such high output ratings are useful in performing high power processes, such as carbon arc gouging.

In some examples, welding applications that require fewer than 350 amps and/or 33 volts, such as operating on a 12000 Watt engine/generator combination, provides power sufficient to achieve a variety of welding processes without the use of supplemental energy storage devices (e.g., without the need for hybrid technology). In some example welding applications, outputs can perform a variety of welding processes with a system rated for lower power outputs (e.g., 125 amps, 25 volts, with an output in a 3500 Watt range). However, this output is low in comparison to a maximum rating of hybrid systems and, in some systems, a lower output may be provided by the energy storage device output without activating the engine (e.g., with the engine not running at all).

In some situations, providing a high output level (e.g., to support an arc gouging process) is used infrequently, such that including an engine suitable to output such a high power level would result in a system having a capacity rating that is rarely used, while including the resources to make such an engine operable (e.g., a high capacity engine, generator, etc.). Thus, by including an energy storage device to supplement the engine power generation capacity provides a system with an extended power output range, while limiting the resources required to construct such a system.

For instance, some diesel engines achieve their highest efficiency producing power at a particular percentage of the rated output (e.g., 50% or greater). Thus, operating the engine below a threshold percentage of the rated output lowers the operating efficiency of the engine. In some examples, when the energy storage device is discharged to a certain threshold level, the engine restarts to recharge the energy storage device, which may also allow simultaneous welding. In this scenario, the energy storage device may cycle a greater number of times than if just used to supplement the output from the engine (e.g., for carbon arc gouging). The benefit of such a tradeoff, however, is lower fuel consumption and extended life of the engine.

Accordingly, a system with improved, customizable efficiency tools is disclosed. Thus, the system maximizes fuel economy, extends the life of the engine and/or the energy storage device, while avoiding unnecessary noise and exhaust from limiting engine use As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "controller" or "control circuitry" includes digital and/or analog circuitry, discrete or integrated circuitry, microprocessors, DSPs, FPGAs, etc., and/or software, hardware and firmware, located on one or more boards, used to control all or part of a welding-type system or a device such as a power supply, power source, engine or generator.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a supercapacitor, etc.

As used herein, the term "memory" includes volatile and non-volatile memory, and can be arrays, databases, lists, etc.

As used herein, the term "torch" or "welding-type tool" can include a hand-held or robotic welding torch, gun, or other device used to create the welding arc.

As used herein, the term "welding mode" or "welding operation" is the type of process or output used, such as CC, CV, pulse, MIG, TIG, spray, short circuit, etc.

As used herein, the term "boost converter" is a converter used in a circuit that boosts a voltage. For example, a boost converter can be a type of step-up converter, such as a DC-to-DC power converter that steps up voltage while stepping down current from its input (e.g., from the energy storage device) to its output (e.g., a load and/or attached power bus). It is a type of switched mode power supply.

As used herein, the term "buck converter" (e.g., a step-down converter) refers to a power converter which steps down voltage (e.g., while stepping up current) from its input to its output.

Figure 1:
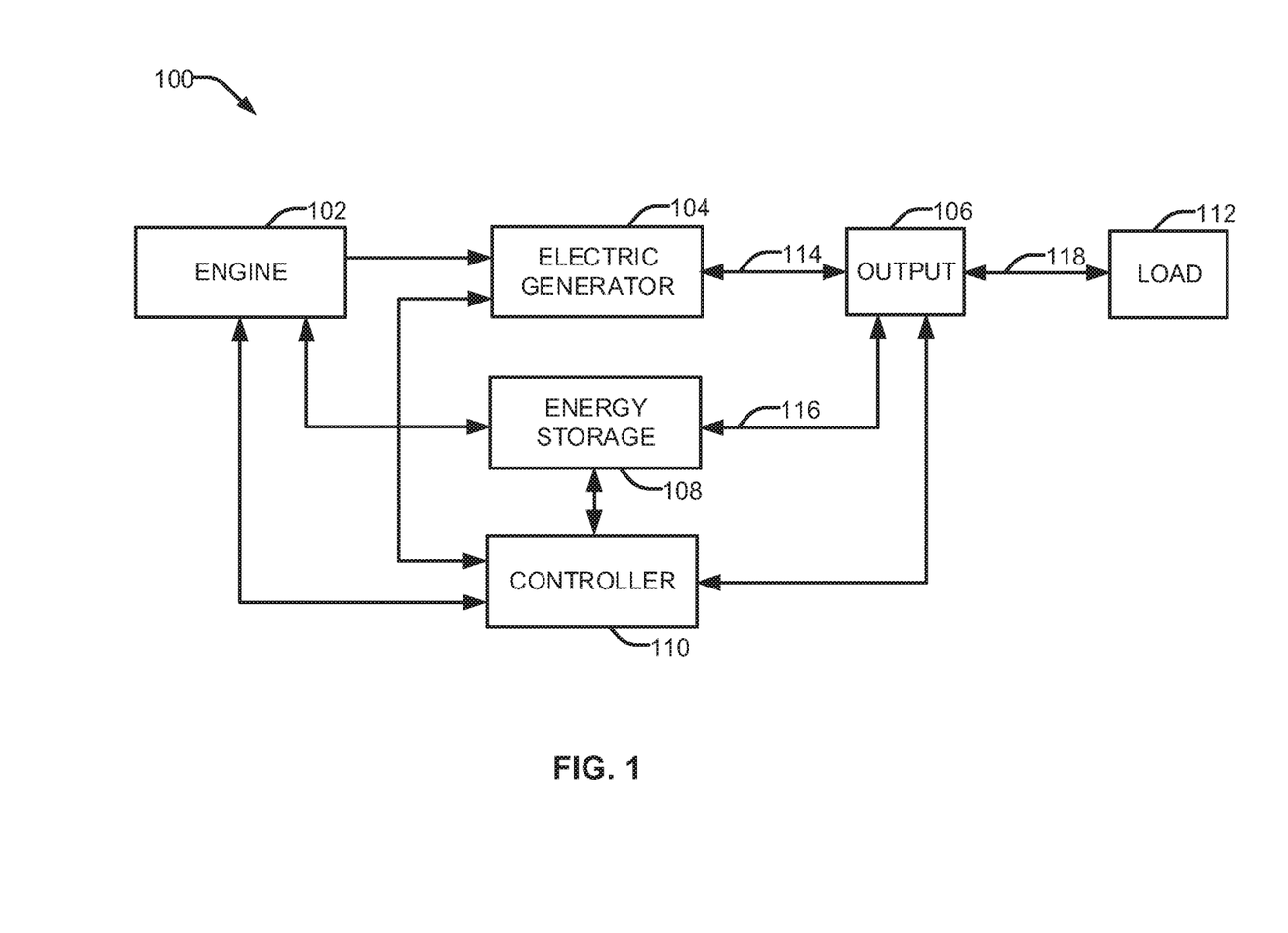
FIG. 1 is a block diagram of an example welding-type power system in accordance with aspects of this disclosure.

FIG. 1 is a block diagram of an example welding-type power system 100. The example power system 100 includes an engine 102 connected to an electric generator 104 to feed an output 106 (e.g., a power receptacle). An energy storage device 108 can also be connected to the output 106, which can provide power to a load 112. In an example, the power output 106 is configured for a particular type of connection (e.g., a welding-type torch cable), while in other examples the power output 106 can be modified to accept multiple types of connectors. In the example of FIG. 1, the output 106 may be configured with multiple connection outputs, and/or one or more adapters to accommodate various loads 112 (e.g., a welding-type torch, a rechargeable battery, 120-volt power cord, etc.).

A controller 110 is connected to one or more of the engine 102, generator 104, output 106, and energy storage device 108. The controller 110 is configured to determine a proportional contribution from each of the engine 102 and/or the energy storage device 108, and command an output accordingly. For instance, the engine 102, via the generator 104, can generate a first power output 114 to the output receptacle 106, whereas the energy storage device provides a second power output 116. The first and second power outputs 114 and 116 are combined into a total power output 118 to power the load 112.

The proportion of each output, from the engine 102 and energy storage device 108, can be determined by an operator (e.g., via a user interface, FIG. 4), by trend analysis, by a determined mode of operation, etc. The controller 110 can automatically command the engine 102 and/or the energy storage device 108 to output power based on the power demand (e.g., the total power output 118) and the determined proportional output of each power source. In an example, a change in power demand, such as by connecting or activating a device (e.g., load 112) at the output 106, generates an automatic response by the controller 110 to activate the engine 102 (e.g. to turn on, increase speed, etc.) and/or draw power from the energy storage device 108.

The welding-type power system 100 can provide power to various loads 112, such as welding-type power to a welding-type torch (e.g., MIG, TIG, GMAW, FCAW, plasma cutter, etc.), power to an auxiliary device (e.g., a preheating device, a wire feeder, a grinder, lighting, etc.), as well as provide battery level power to charge a battery. The various loads may be identified by a feedback signal associated with the output 106, for example. Thus, the feedback signal can inform the controller 110 as to what load is present, identify a corresponding mode of operation, etc. For example, when the load 112 is a welding-type torch, the controller 110 can determine a type of load (e.g., associated with a welding mode of operation) associated with an expected measured power draw. Additionally or alternatively, a rechargeable battery or auxiliary type tool can be connected to the output 106, such that the controller 110 determines the type of load and mode of operation (e.g., a battery charging mode, a 120 V output, etc.).

Some engines may have specific ranges of output (e.g., associated with operating speeds, temperature profiles, etc.) where fuel efficiency is at a peak. Efficiency of the engine 102 may also be affected by the load on the engine (e.g., as the amount of torque to turn attached components increases). For example, the engine 102 may be driving the electric generator 104, which may require additional torque to generate a higher power output 114. Additionally or alternatively, the engine 102 may be driving an air compressor, which may increase the speed and/or torque from the engine 102 to operate the connected components.

Conventional engines have an efficiency of about 40% in the engine speed range of idle to about 1,800 rpm, for example. Thus, for every 100 units of energy input, 40 units are delivered as output. The remainder is ejected as heat from the exhaust, as mechanical sound energy, or consumed by the motor (e.g., by friction, heat through the cylinder walls or cylinder head, and work used to turn engine equipment). In some examples, more fuel is consumed with increased speed, due to the increasing mechanical and pumping losses. Such information can be added to the controller 102 to determine a desired operating efficiency, determine the proportion of the output from the engine 102 based on the desired efficiency, and command the engine 102 to operate accordingly.

In some examples, the energy storage device 108 is a rechargeable battery pack (e.g., a lithium-ion battery, a nickel-metal hydride battery, lead-acid battery, etc.). In other examples, the energy storage device 108 is a hybrid battery module, a capacitor, a supercapacitor, or any other type of suitable storage device, or a combination of a rechargeable battery pack and a hybrid battery module.

In examples, the useful life of the energy storage device 108 can be a measure of performance and longevity, which can be quantified in several ways. For example, the controller 110 can determine a duration of run time on a full charge, based on an estimate of the manufactured rating, as a number of discharge/charge cycles remaining until the end of useful life, and/or depth of each discharge/charge event.

The amount of energy the energy storage device 108 holds is measured in capacity. Capacity is the leading indicator that determines useful life of the energy storage device 108. The useful life of an energy storage device 108 can be described with reference to the number of remaining cycles. For example, Lithium- and nickel-based rechargeable batteries deliver between 300 and 500 full discharge/charge cycles before the capacity drops below 80 percent.

In examples, a discharge/charge cycle is the process of charging and discharging the energy storage device 108 to power a load, and recharging the device 108. A cycle refers to a sequence in which a charged battery is discharged and then recharged. One complete sequence constitutes one cycle. The process can be one indicator of the energy storage device's 108 remaining useful life and/or capacity, as the number of discharge/charge cycles affects useful life more than the mere passage of time.

Additionally, the depth of each discharge event can be a factor in determining remaining useful life of the energy storage device 108. If, for example, no more than 20 percent of the capacity is discharged at any given time, even a greater number of discharge/charging events will have a relatively limited impact on the useful life versus a smaller number of discharge/charging events that completely drain the energy storage device 108. For example, at an 80% depth of discharge, a battery may estimate about 400 cycles remaining. For a 100% depth of discharge, a battery may estimate about 320 cycles remaining.

Additionally or alternatively, the controller 110 can perform an analysis based on manufacturing specifications that can affect useful life of the energy storage device 108, including the type, number and/or the quality of battery cells used.

In addition to cycling events, other factors can contribute to loss of capacity. For example, keeping a battery at an elevated temperature induces stress to the components therein. For instance, a fully charged Li-ion battery stored at a temperature of about 40° C. may lose about 35 percent of its capacity in a year without ever cycling. Information about the storage of an energy storage device can also be included in a determination as to the remaining useful life of the device, and thus the proportion of the total power output 118 should be drawn from the energy storage device 108.

Thus, the controller 110 is configured to monitor and control when and how the energy storage device 108 is to be used to augment the weld power output 116 at the output 106. For example, the power from the energy storage device 108 can supplement the full operating power from the engine 102 to provide a greater power output than the rated engine output. In this example, high power activities, such as clearing a short or a gouging operation, can be performed by conditioning the power output 114 via a converter.

Figure 2:
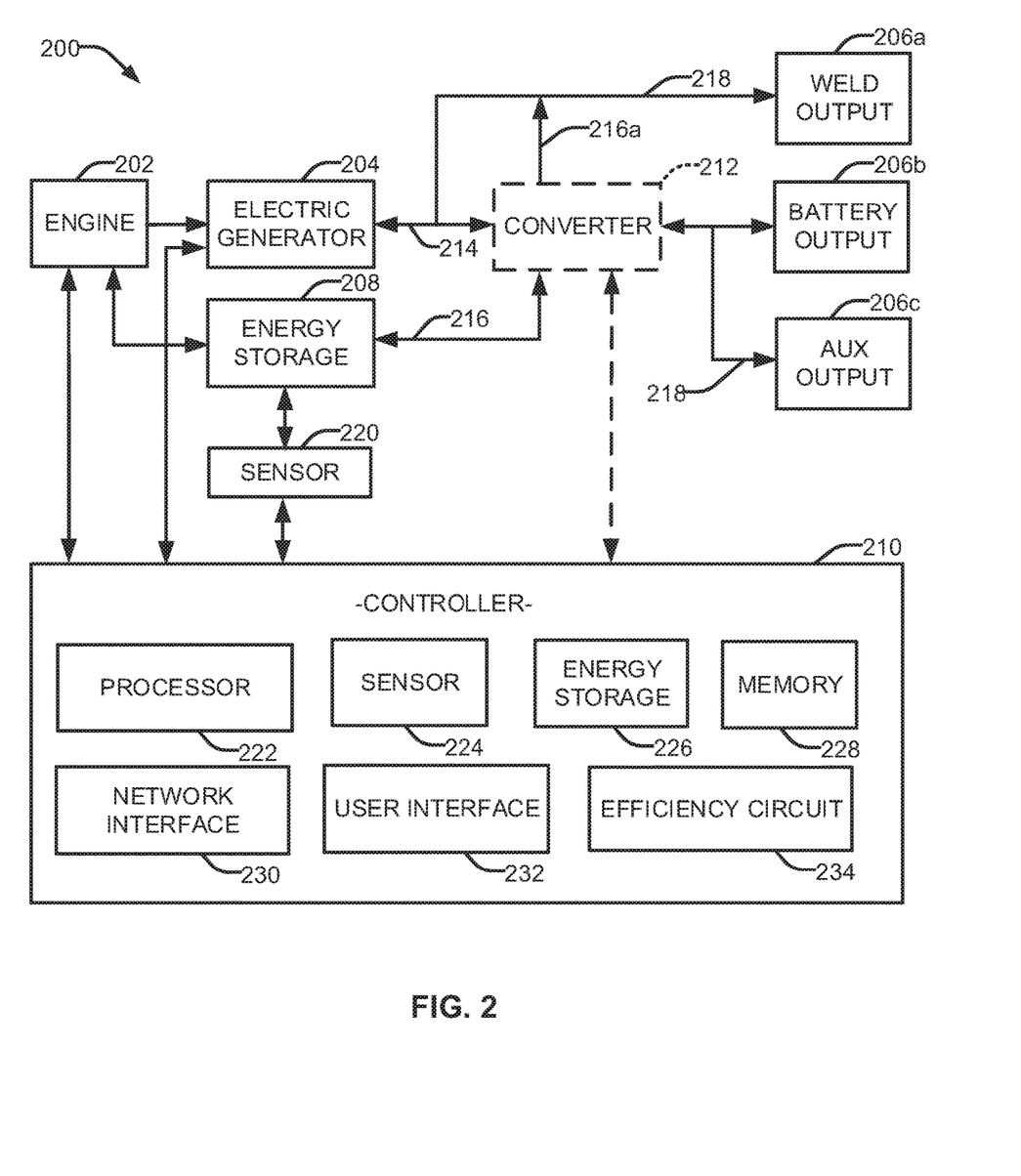
FIG. 2 illustrates a block diagram of another example welding-type power system in accordance with aspects of this disclosure.

FIG. 2 is a block diagram of an example welding-type power system 200. System 200 can be configured to operate with one or all of the features disclosed with respect to system 100, as provided herein. The example power system 200 includes an engine 202 connected to an electric generator 204 to provide a power output 214 with a voltage sufficient to power a welding-type tool, directed to a welding output 206a, a battery charging output 206b, and/or an auxiliary power output 206c. In some examples, a converter 212 can be used to convert power for the battery charging output 206b and/or the auxiliary output 206c (e.g., to power auxiliary power components, such as a wire feeder, compressed air system, etc.).

A system sensor(s) 220 monitors characteristics corresponding to, among other things, engine 202 operational parameters (e.g., run time, temperature, fuel consumption, etc.), energy storage device 208 parameters (e.g., number of discharge/charge events, depth of charge, time in operation, etc.) and one or more parameters associated with total power output 218 and power demand (e.g., a voltage, current, temperature, resistance, impedance, etc.). The information provided by the sensor 220 to a controller 210 is used to determine when the engine 202 and the energy storage device 208 are to be employed to output power, for how long, at what level, etc.

The controller 210 can be configured as a microcontroller, or to include a processor 222, to perform as a programmable logic circuit (e.g., efficiency circuit 234), a system-on-chip, a programmable logic device, and/or any other type of logic circuit. In some examples, the controller 210 can include a memory storage device 228, an energy storage device 226, a sensor 224, a network interface 230, and/or a user interface 232.

The efficiency circuit 234 can be implemented in hardware and/or software, and can be configured to receive information regarding the total power output 218, a desired efficiency of the engine 202, and a remaining target life of the energy storage device 208. The information can correspond to, for example, engine operational parameters, energy storage device parameters, other sensor data, a user input, as well as data related to trend analysis, threshold values, profiles associated with a particular mode of operation, etc., can be stored in a comparison chart, list, library, etc., within memory 228.

In examples, information regarding system usage trends based on the monitored signals can be analyzed and stored (e.g., in memory 228). These stored trends can be used to predict when the controller 210 should control the engine 202 to start, stop and/or adjust speed, and/or activate the energy storage device 208, in response to a change in the power demand and/or a determined mode. The usage trends can be specific to the system 100, 200, or be loaded onto the memory 228 (via interfaces 230, 232) to reflect usage trends of other systems.

Based on related information, the efficiency circuit 234 determines the proportional values for a power output 214 from the engine 202, and a power output 216 from the energy storage device 208. The proportional values can be added to make up the total power output 218 to one or more of the outputs 206a, 206b, and 206c based on a power demand signal that indicates a contribution of the first power output 214 and second power output 116. Additionally or alternatively, the controller can periodically transmit a test signal to monitor the outputs 206a, 206b, and 206c (e.g., to determine when a welding-type torch is present, or a rechargeable battery is fully charged).

Based on one or more measured parameters (e.g., change in voltage, change in current, change in temperature, etc.), as well as historical data, the controller 210 can determine the type of power draw and/or mode of operation. For instance, if the controller 210 determines a quick cut operation is being performed, the controller 210 can activate the converter 212 and draw power from the energy storage device 208 to satisfy the brief increase in power demand without adjusting the speed of the engine 202. Similarly, clearing a short or a gouging operation can be performed by supplementing the power output with power from the energy storage device 208.

If, however, the controller 210 determines a more significant increase in power demand (e.g., commencement of a particular welding type operation), the controller 210 can determine the speed of the engine 202 should be increased. The controller 210 continues to monitor the power demand, and will adjust the speed of the engine 202 and the activation and/or deactivation of the energy storage device 108 accordingly.

If the engine 202 reaches an appropriate operating speed to satisfy the measured power demand, the controller 210 will disable/turn off the converter 212 and therefore stop supplementing with power from the energy storage device 208. The energy storage device 208 can then connect to the engine 202 via the converter 212 to recharge while the engine 202 is rotating at normal operating speeds. The converter 212 can be a buck converter in some examples. In some examples, the converter 212 is a boost converter and/or a bi-directional converter.

In any event, the controller 210 can selectively control the power provided to each output. Consistent with the disclosed examples, each of the outputs 206a, 206b, 206c can provide the same level of power (e.g., each operating in a welding mode or a battery recharging mode), or different levels of power. In this example, the output 206a can be operating in a welding mode, and output 206b can be powering a rechargeable battery. In yet another example, the output 206c provides auxiliary 115 or 220 VAC power, independent of or simultaneously during a welding operation to power, e.g., lights, a grinder, a battery charger, etc.

In some examples, power output 216 contributes to the total power output 218 to provide welding power to weld output 206a. Thus, a converter 212 is used to condition power 216a suitable for weld type power. In other examples, power output 214 and/or power output 216 is conditioned by the converter 212 to provide power output 218 to battery output 206b and auxiliary output 206c. In an example, the efficiency circuit 234 determines that only one of the two power sources is to be activated. In this scenario, the total output 218 equals either the power output 214 or the power output 216.

The system 200 can include a user interface 232 (e.g., a switch, a computer input device, etc.) to provide options for an operator to control a function of the power sources and/or outputs at the system 200, such as designating the proportional value of power outputs 214 and 216. Additionally or alternatively, the user interface 232 can include a list of operations with either a set of known parameters, or a list of operations that correspond to a learned operation. Thus, the known or historical actions and conditions during a particular operation will aid in the determination of when to start, stop or adjust a speed of the engine 202, as well as when to draw power from the energy storage device 208 to supplement or replace the power output 214 from the engine 202.

In some examples, the controller 210 includes a network interface 230 configured to send and/or receive information from a remote device (e.g., a remote computer, a cloud computing environment, etc.). The calculations, determinations, comparisons, analysis, stored data, etc., can be performed and/or updated via network interface 230.

In some examples, one or more component may be in direct communication with another component, for example, one or more of the various system components (e.g., the controller 210) can be directly linked to any one or more of the other components (e.g., the electric generator 204, the converter 212, the sensors 220, etc.) to facilitate communication.

Figure 3:
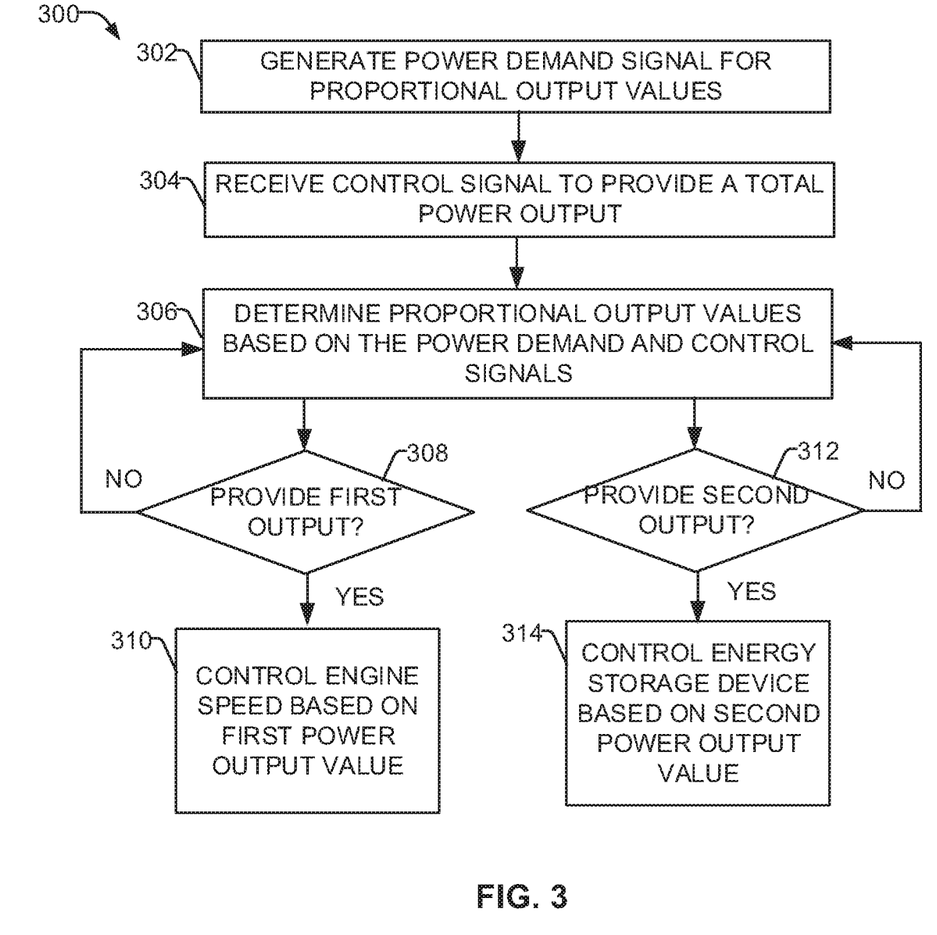
FIG. 3 illustrates an example method of operating a welding-type power system in accordance with aspects of this disclosure.

FIG. 3 is a flowchart illustrating example method 300 of operating a welding-type power system, for example, the welding-type power system 100 of FIG. 1 and the welding-type power system 200 of FIG. 2. The method 300 of FIG. 3 may be implemented by a controller (e.g., controllers 110, 210) by executing machine-readable instructions, such as stored on a non-transitory machine-readable storage device (e.g., memory 228).

At block 302 of method 300, a power demand signal is generated which indicates a proportional contribution for a power output from each of an engine (e.g., engine 102, 202) and an energy storage device (e.g., energy storage device 108, 208). For example, the power demand signal can be generated from a user interface, such as a selector switch. In other examples, the power demand signal is generated from an operational profile based on usage trends associated with stored and/or networked information. In one or both scenarios, the proportional contribution can be based on a target engine operating efficiency value and a remaining target life of the energy storage device At block 304, the controller of the welding-type power system (e.g., system 100, 200) receives a control signal to provide a total power output (e.g., total power output 218) to at least one of a welding-type output (e.g., output 106, 206a) or an auxiliary type output (e.g., output 106, 206c). At block 306, the controller determines the proportional values for the first power output and the second power output that add up to the total power output based on the power demand signal and the control signal.

At block 308, the controller determines whether the first power output is needed from the engine based on the proportional values. If yes, the process advances to block 310, where the controller controls the engine to adjust speed based on the first power output value. If not, the method returns to block 306 for further analysis.

At block 312, the controller determines whether the second power output is needed from the energy storage device based on the proportional values. If yes, the process advances to block 314, where controller controls a connection (e.g., converter 212) from the energy storage device to provide the second power output based on the second power output value. If not, the method returns to block 306 for further analysis.

Figure 4:
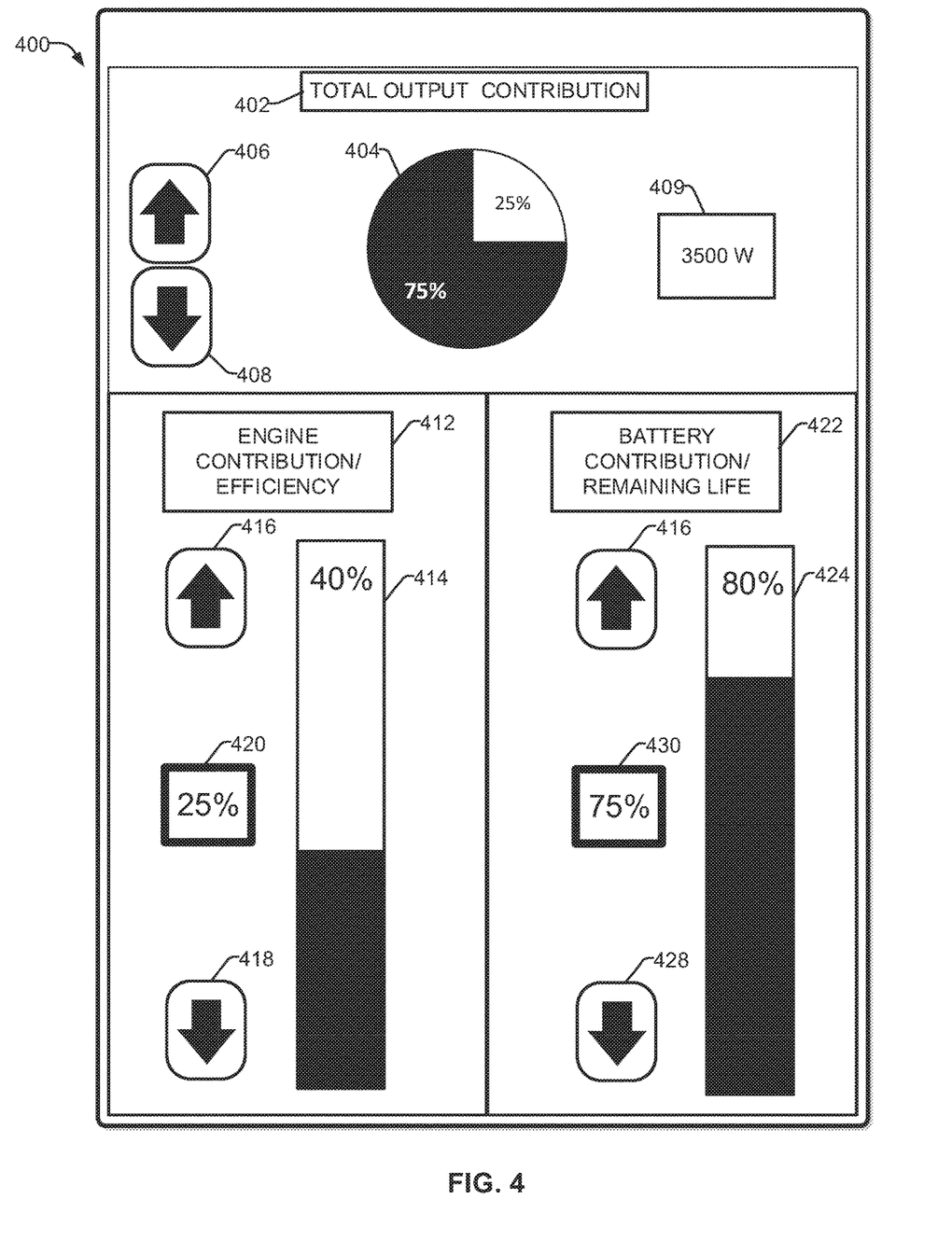
FIG. 4 illustrates an example user interface for operating a welding-type power system in accordance with aspects of this disclosure.

FIG. 4 illustrates an example interface 400 to provide graphic representations of the selected contributions. The interface 400 can be configured as a display with integrated touch screen capabilities, or reflect changes made via a separate knob, remote, wireless commands, etc. In some examples, the interface 400 displays operating parameters that reflect determinations from execution of one or more algorithms or logic routines (e.g., results from analysis of the controller 110, 210). For example, the knob can be a single knob-type selector with a range of proportional values across an efficiency spectrum overlapping a target energy storage capacity. In other words, a full turn to a first position would command the system to maximize engine efficiency, whereas a full turn to a second position (e.g., opposite the first position) would maximize energy storage capacity. In accordance with the present disclosure, the engine efficiency and energy storage capacity can be determined by the controller based on sensor data, a user input, an operational profile, etc.

As shown, the interface 400 displays information regarding total output contribution in section 402. Therein, a total power output value 409 (e.g., corresponding to total power output 118, 218) is provided, as well as a reference to proportions of each, such as a graph, histogram, or other visual manner, shown in 404. In this example, graph 404 illustrates a 25% contribution from the engine, and a 75% contribution from the energy storage device. Thus, the total adds up to 100% of the total power output 409 (e.g., 3500 Watts). Selectors 406 and 408 can provide scrolling features and/or allow for the proportional values to be adjusted.

Section 412 illustrates the engine contribution and efficiency values. For example, the operational efficiency of the engine can be displayed graphically 414 (e.g., 40%). The engine's contribution to the output can be displayed at 420, numerically, graphically, etc. Selectors 416 and 418 can allow the user to adjust the proportion of the engine's contribution, and/or the desired efficiency level.

Section 422 illustrates the energy storage device contribution and remaining life (e.g., capacity) of the device. In a manner similar to screen portion 412, the remaining life of the energy storage device can be displayed graphically 424 (e.g., 80%). The energy storage device's contribution to the output can be displayed at 430. Selectors 426 and 428 can allow the user to adjust the proportion of the energy storage device's contribution, and/or the desired remaining life.

As described herein, the systems and methods provide improved arc starts, especially at with high amperage electrodes, and offers advantages for short clearing while welding. Moreover, employing the integrated energy storage device to augment power output of the system is a cost-effective solution to improved arc starts on an engine drive.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system, comprising:
   an engine configured to drive an electric generator to provide a first power output;
   an energy storage device to provide a second power output; and
   a controller configured to:
   receive one or more control signals to provide a total power output to at least one of a welding-type output or an auxiliary type output;
   determine a target engine operating efficiency value based on at least one of engine speed, engine temperature, fuel consumption, or total time in operation;
   determine a power demand signal based on the target engine operating efficiency value and a remaining target life of the energy storage device;
   determine values for the first power output and the second power output that add up to the total power output based on a power demand signal that indicates a contribution of the first power output and the second power output;
control the engine to adjust the engine speed based on the first power output value; and
control a connection from the energy storage device to provide the second power output to the welding-type output based on the second power output value.

2. The system of claim 1, wherein the power demand signal is generated in response to a command from a user interface.

3. The system of claim 2, wherein the user interface comprises a selector for input of the contribution based on the target engine operating efficiency value and a remaining target life of the energy storage device.

4. The system of claim 3, wherein engine operating efficiency is based on engine speed, temperature, fuel consumption, or total time in operation.

5. A welding-type system, comprising:
an engine configured to drive an electric generator to provide a first power output;
an energy storage device to provide a second power output; and
a controller configured to:
receive one or more control signals to provide a total power output to at least one of a welding-type output or an auxiliary type output;
calculate a number of performed discharge cycles of the energy storage device;
determine a number of remaining discharge cycles of the energy storage device based on the number of performed discharge cycles;
calculate a power demand signal based on the determined number of remaining discharge cycles;
determine values for the first power output and the second power output that add up to the total power output based on a power demand signal that indicates a contribution of the first power output and the second power output;
control the engine to adjust speed based on the first power output value; and
control a connection from the energy storage device to provide the second power output to the welding-type output based on the second power output value.

6. The system of claim 1, further comprising a sensor configured to measure a characteristic of the energy storage device, the controller further configured to:
receive the measured characteristic from the sensor; and
determine a remaining target life of the energy storage device based on the characteristic.

7. The system of claim 6, wherein the characteristic comprises voltage, temperature, current, total time in use, or percentage of energy storage capacity depleted during each discharge cycle.

8. The system of claim 1, the controller configured to:
compare the total power output to a power output capacity of the energy storage device; and
adjust the value of the second power output to meet the total power output when the total power output is less than the power output capacity of the energy storage device.

9. The system of claim 1, wherein the total power output is greater than a power output capacity of the generator.

10. The system of claim 1, wherein a power output capacity of the combined generator and energy storage device is greater than the individual power output capacity of the generator or the energy storage device alone.

11. The system of claim 1, further comprising a fuel cell configured to provide energy for a power input for the welding system.

12. A welding-type power system, comprising:
an engine configured to drive an electric generator to provide a first power output;
an energy storage device to provide a second power output;
a sensor to monitor a characteristic of the energy storage device; and
a controller configured to:
receive the monitored characteristic and store the characteristic in a memory storage device;
generate an operational profile based on usage trends associated with the stored characteristic, wherein the operational profile comprises a ratio of the first power output to the second power output based on engine operational efficiency and a remaining target life of the energy storage device;
determine proportional values for the first power output and the second power output that add up to a total power output based on the operational profile;
control the engine to adjust speed to provide the first power output to the welding-type output in response to the first power output value; and
control a connection from the energy storage device to provide the second power output to the welding-type output in response to the second power output value.

13. The system of claim 12, wherein the controller is further configured to generate an alert when the remaining target life of the energy storage device falls below a threshold value.

14. The system of claim 12, wherein a first welding operation corresponds to a first operational profile and a second welding operation corresponds to a second operational profile.

15. The system of claim 14, wherein the first operation or the second operation corresponds to an arc welding operation, a gouging operation, a MIG welding operation, an auxiliary output, or a battery recharging operation.

16. The system of claim 12, wherein the connection comprises a boost converter configured to connect the energy storage device to the welding-type output and to convert power from the energy storage device to provide the second power output to the welding-type output.

17. The system of claim 12, wherein the connection comprises a buck converter to connect the energy storage device to the welding-type output in response to a signal indicating the energy storage device is charged below a first threshold level.

18. The system of claim 17, wherein the controller is configured to control the buck converter to disconnect the energy storage device from the welding-type output in response to a signal indicating the energy storage device is charged above a second threshold level.

19. The system of claim 12, wherein the energy storage device comprises one or more of a lead acid battery, a nickel cadmium battery, a lithium ion battery, a capacitor, a supercapacitor, or any combination thereof.

* * * * *